(12) United States Patent
Bahrami et al.

(10) Patent No.: US 10,387,145 B1
(45) Date of Patent: Aug. 20, 2019

(54) MAPPING API PARAMETERS

(71) Applicant: FUJITSU LIMITED, Kawasaki-shi, Kanagawa (JP)

(72) Inventors: Mehdi Bahrami, Sunnyvale, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 44 days.

(21) Appl. No.: 15/887,906

(22) Filed: Feb. 2, 2018

(51) Int. Cl.
*G06F 9/44* (2018.01)
*G06F 8/73* (2018.01)
*G06F 9/54* (2006.01)

(52) U.S. Cl.
CPC .............. *G06F 8/73* (2013.01); *G06F 9/541* (2013.01)

(58) Field of Classification Search
CPC ..................................................... G06F 9/541
USPC .......................................... 717/123; 719/328
See application file for complete search history.

(56) References Cited

U.S. PATENT DOCUMENTS

| | | | | |
|---|---|---|---|---|
| 6,854,123 | B1 * | 2/2005 | Lewallen | G06F 8/447 717/106 |
| 7,269,833 | B2 * | 9/2007 | Kushnirskiy | G06F 9/44 719/328 |
| 9,811,395 | B1 * | 11/2017 | Greenwood | G06F 9/541 |
| 2006/0156314 | A1 * | 7/2006 | Waldorf | G06F 9/4484 719/328 |

OTHER PUBLICATIONS

Hao Zhong et al., "Mining API Mapping for Language Migration", May 2010, pp. 195-204 (Year: 2010).*
Hao Zhong et al., "Exposing Behavioral Differences in Cross-Language API Mapping Relations", 2013, pp. 130-145 (Year: 2013).*
U.S. Appl. No. 15/374,798, filed Dec. 9, 2016.
U.S. Appl. No. 15/715,658, filed Sep. 26, 2017.
U.S. Appl. No. 15/851,599, filed Dec. 21, 2017.
U.S. Appl. No. 15/453,893, filed Mar. 8, 2017.

\* cited by examiner

*Primary Examiner* — Wei Y Zhen
*Assistant Examiner* — Lanny N Ung
(74) *Attorney, Agent, or Firm* — Maschoff Brennan

(57) ABSTRACT

A system may include a communication interface and a processor operatively coupled to the communication interface. The processor may receive a defined API specification, which may include an API table in a first format in which each column may be associated with an API parameter. The processor may generate a key model that includes one or more API parameters of the API table mapped to a corresponding class of API parameters in a defined format based on the defined API specification. The processor may receive an extracted table in which each column may be associated with an API parameter in the first format. The processor may associate each column of the extracted table with a class of API parameters in the defined format based on the key model. The processor may generate an API specification that includes the API parameters of the extracted table in the defined format.

20 Claims, 7 Drawing Sheets

US 10,387,145 B1

MAPPING API PARAMETERS

FIELD

The embodiments discussed herein are related to API parameter mapping.

BACKGROUND

An Application Programming Interface (API) is a set of routines, protocols, and tools for building software applications. An API specifies how software components should interact and APIs are used when programming graphical user interface (GUI) components. An API typically exposes functions or data of a software application that enables other applications to use the API's resources without concern for implementation of the functions or data.

The subject matter claimed herein is not limited to embodiments that solve any disadvantages or that operate only in environments such as those described. Rather, this background is only provided to illustrate one example technology area where some embodiments described herein may be practiced.

SUMMARY

According to an aspect of an embodiment, a system may include a communication interface, and a processor operatively coupled to the communication interface. The processor may be configured to receive, via the communication interface, a defined API specification. The defined API specification may include an API table in a first format and each column of the API table may be associated with an API parameter. The processor may also be configured to generate a key model. The key model may be based on the defined API specification. The key model may include one or more API parameters of an API documentation included in the API table mapped to a corresponding class of API parameters in a defined format. In some embodiments, the API table may include a hypertext markup language (HTML) table. Additionally, the processor may be configured to receive, via the communication interface, an extracted table. Each column of the extracted table may be associated with an API parameter in the first format. The processor may be configured to associate each column of the extracted table with a class of API parameters in the defined format based on the key model. The processor may also be configured to generate an API specification that includes the API parameters of the extracted table in the defined format.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
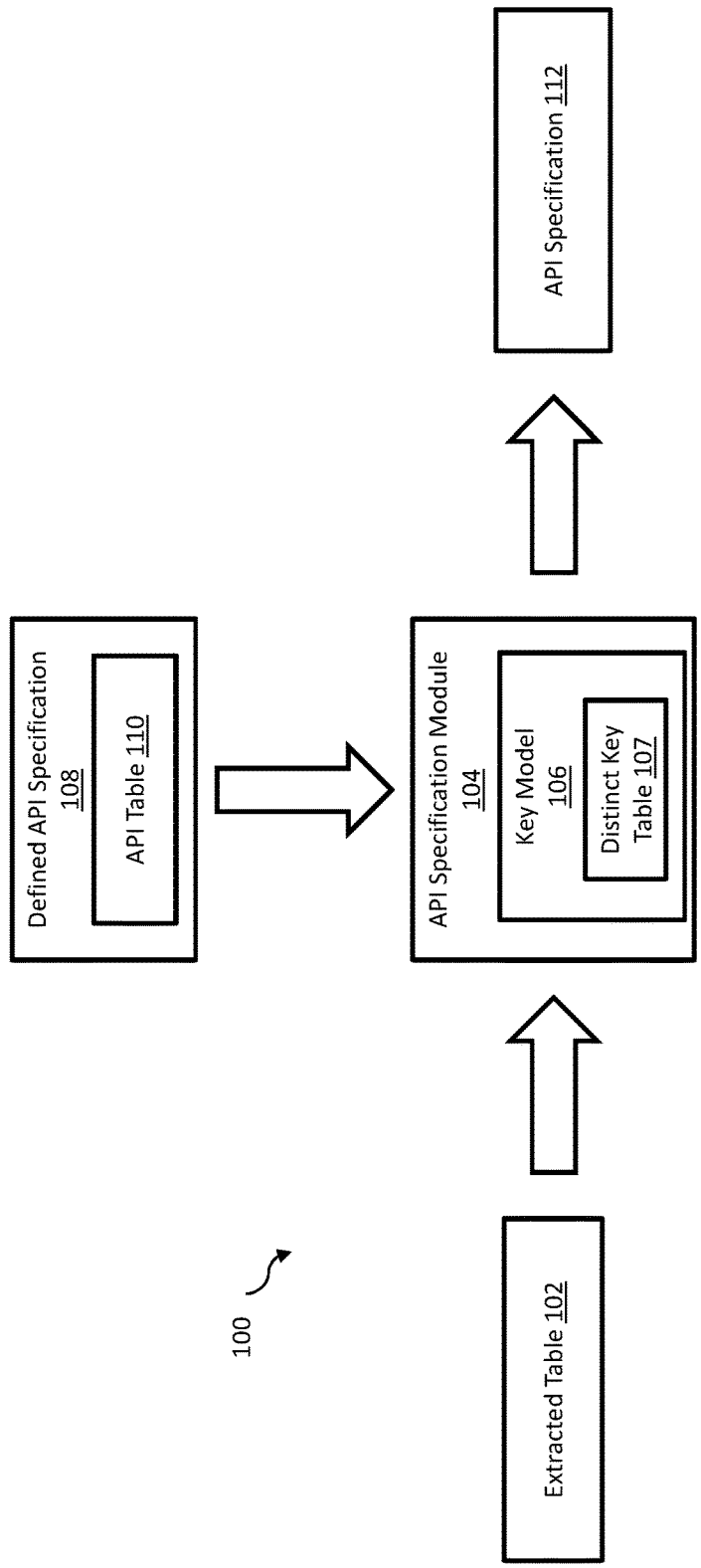
FIG. 1 illustrates an example environment related to mapping API parameters.

There are several types of application programming interfaces (APIs). A web API, for example, may expose its functions and data through a web service in the Internet or an intranet. A device API may expose device hardware modules functionalities to other devices and/or software. An application API may provide access to a database or a function of a software application, such as through an operating system. Typically, APIs may be useful for developers when implementing a new system based on services, functions, or data provided from or through APIs. Conventional APIs often work as a "black box" that provide a service while the developer is not typically able to see inside the black box to identify details of the implementation. Some APIs may abstract the complexity of a system and some APIs may hide some details from developers that may reduce flexibility in the implementation.

Each API typically publishes its own services and/or data through different protocols having different types of data with different attributes. This conventional approach may cause a heterogeneously issue when a developer is working with a variety of APIs. Further, most APIs do not have formal definitions and most of them are human readable description which is described as an HTML file. As a result, software developers typically read and learn the API documentation in order to access and interact with an API function. To further complicate software development, each API may be accessible through different programming languages.

Some API publishers use standard API formats (e.g., defined API formats) to describe API parameters included in API specifications. Meanwhile, other publishers do not use standard API formats to describe API parameters included in API specifications. To simplify access and readability of API specification, an extracted table may include information extracted from API documentation. The extracted table may include different properties, attributes, or fields of the API documentation. Mapping the different properties, attributes, or fields to a defined format may present a challenge since API publishers may not understand different terms (e.g., key terms, value terms, or root parents) being considered for mapping the different properties, attributes, or fields to the defined format. For example, a key term associated with a particular class of API parameter in one format may include "parameter name" and a key term associated with the particular class of API parameter in another format may include "field name." This difference in key terms may cause errors or other issues during mapping of the different properties, attributes, or fields in the various API documentation to the defined format.

One or more machine readable API specifications written in one or more machine readable formats (e.g., Open API specification, JavaScript notation (JSON), etc.) may be used to train a key model to make it possible to understand the different terminology and map the different properties, attributes, or fields to a defined format. The key model may consider all equivalent key terms of a property, attribute or field; all value terms of the given property, attribute, or field; and the structure (e.g., the root parent) of the given property, attribute, or field. This may permit the key model to understand the various terminology, the structures of the various terminology, and other possible field names for a variety of API parameters in a variety of formats.

This may permit mapping of different API parameters based on corresponding value terms associated with the different API parameters. For example, an API parameter in one format may include a key term that includes "name of parameter" and a value term that includes "ID" and an API parameter in another format may include a key term that includes "parameter" and a value term that includes "ID." If the mapping was performed based solely on the key terms, the API parameters may not be mapped to a similar class of API parameters. Instead the mapping may be based on the value terms being the same or substantially similar (e.g., the value terms "ID" being the same or substantially similar). In this scenario, both key terms "parameter" and "parameter name" may be mapped to a class of API parameters associated with parameter name.

Additionally, this may permit mapping of different API parameters based on corresponding root parents associated with the different API parameters. For example, an API parameter that includes the key term "name" and value term "ID" may be mapped to the class of API parameters associated with parameter name based on a subsequent API parameter including a key term "default" and a value term "Null" since the root parent (e.g., file path) of the API parameter and the subsequent API parameter are the same or substantially similar to root parents of defined formats.

FIG. 1 illustrates an example environment 100 related to mapping API parameters, arranged in accordance with at least one embodiment described in the present disclosure. For example, the environment 100 may be related to mapping API parameters included in an extracted table 102 to classes of API parameters in a defined format based on key terms, value terms, and/or root parents associated with the API parameters in the extracted table. The environment 100 may include an API specification module 104 configured to map the API parameters included in the extracted table 102 to the classes of API parameters in the defined format using a key model 106 that may be based on a defined API specification 108. The defined format may include a machine readable format. The API specification module 104 may be configured to output an API specification 112, which may include the API parameters of the extracted table 102 mapped to classes of API parameters in the defined format.

The API specification module 104 may include a computer-based hardware device that includes a processor, memory, and/or communication capabilities. The API specification module 104 may include a processor-based computing device. For example, the API specification module 104 may include a hardware server or another processor-based computing device configured to function as a server. The API specification module 104 may include memory and network communication capabilities. The API specification module 104 may perform various operations related to mapping API parameters in a first format to classes of API parameters in the defined format, as described in this disclosure.

The defined API specification 108 may include an API table 110. The API table 110 may include one or more API parameters in the first format. For example, the one or more API parameters may be stored in the JSON format, the open API format, or any other acceptable format for API parameters. Additionally, the defined API specification 108 may include a machine readable format. The API table 110 may include one or more API parameters in the first format in which each column may be associated with an API parameter or any other table type (e.g., a table that describes response type, data type, security information, authentication, etc.), In some embodiments, the API table 110 may include one or more columns and each column may correspond to a different API parameter. Each API parameter (e.g., each column) may include one or more key terms, value terms, and/or root parents.

The key terms may define the associated API parameter. For example, a key term may include "required," which may define the associated API parameter as a requirement API parameter. Further examples of key terms may include but are not limited to "necessary," "is required," and "required." The value terms may indicate what information may be associated with a corresponding key term. For example, value terms for required key terms may include "true," "yes," and "no." Additionally, the root parents may indicate a file path for the corresponding key term and or value term. For example, a root parent may include "parameter"→"required: true."

The API specification module 104 may be configured to generate the key model 106 based on the defined API specification 108 and/or the API table 110. The API specification module 104 may extract a key term from each column of the API table 110. Additionally, the API specification module 104 may extract a value term from each column of the API table 110. Furthermore, the API specification module 104 may extract a root parent for each key term and/or value term from each column of the API table 110. An example API specification including an API table is discussed in more detail below in relation to FIG. 4.

The key model 106 may include different classes of key terms and associated API parameters in the defined format. Each class of key terms in the key model 106 may include a set of similar key terms from the API table 110. For example, a "required" class of key terms may include the key terms "required value" and "necessary." Additionally, the key model 106 may include a target table (e.g., API parameters) in the defined format based on the defined API specification 108.

The key model 106 may include a distinct key table 107, which may be generated to associate the key terms, value terms, and root parents included in the API table 110 in the defined format. The defined format may include the JSON format, a standard machine readable API (SMRAPI) format, a Swagger format, an Open API specification format, a yet another markup language/YAML aint markup language (YAML) format, an extensible markup language (XML) format, a text format, or any other acceptable format for API parameters. A first column of the distinct key table 107 may include each key term in the API table 110 in a different row. A second column of the distinct key table 107 may include each value term in the API table 110 in the same row as a corresponding key term. For example, a key term may include "required" and a corresponding example value term may include "True." The value term "true" may be mapped to the same row as the key term "required." Additionally, a third column of the distinct key table 107 may include each root parent in the API table 110 in the same row as the corresponding key term and value term.

The API specification module 104 may determine whether one or more key terms in the distinct key table 107 are the same or substantially similar. In response to one or more key terms being the same or substantially similar, the corresponding key terms, value terms, and/or root parents may be associated with each other in the distinct key table 107.

Key terms, value terms, and/or root parents in the API table 110 that do not have a corresponding key term, value term, and/or root parent of a class of API parameters in the defined format may not be mapped to the distinct key table 107 so as to include only API parameters that can be mapped to the defined format in the distinct key table 107.

The key model 106 may be generated to map the key terms, value terms, and root parents in the distinct key table 107 to corresponding classes of API parameters in the defined format. For example, a row of the distinct key table 107 may be mapped to a first class of API parameters if a key term, a value term, and/or a root parent in the row corresponds to a key term, a value term, and/or a root parent of the first class of API parameters in the defined format. The key terms, value terms, and root parents in the row may be mapped to the first class of API parameters in the defined format so as to relate the different key terms, value terms, and root parents of the distinct key table 107 and the first class of API parameters in the defined format in a single format (e.g., the defined format).

In some embodiments, the key model 106 may include the key terms, value terms, and/or root parents of the distinct key table 107 mapped to a corresponding key term, value term, and/or root parent of a class of API parameters in the first format.

Associating the key terms, value terms, and root parents of the API table 110 to a corresponding class of API parameters in the key model 106 may permit the API specification module 104 to map the API parameters in the extracted table 102 in the first format and/or the defined format to corresponding classes of API parameters in the defined format using the key model 106. For example, the API table 110 may include API parameters in the JSON format and the key model 106 may be generated to map one or more API parameters of the API table 110 in the JSON format to corresponding classes of API parameters in the open API format. If the extracted table 102 includes API parameters in the JSON format and/or the open API format, the API specification module 104 can map the API parameters in either format to API parameters in the open API format.

The API specification module 104 may be configured to receive the extracted table 102. In some embodiments, each column of the extracted table 102 may include an API parameter in the first format. Alternatively, each column of the extracted table 102 may include an API parameter in the defined format. In some embodiments, each column of the extracted table 102 may include an API parameter in either the first format or the defined format. The extracted table 102 may also include key terms, value terms, and/or root parents associated with each of the API parameters.

The API specification module 104 may determine a key similarity score of the key terms in each column of the extracted table 102 and each column in the distinct key table 107. Likewise, the API specification module 104 may determine a value similarity score of the value terms in each column of the extracted table 102 and each column in the distinct key table 107. Additionally, the API specification module 104 may determine a structure similarity score of the root parents in each column of the extracted table 102 and each column in the distinct key table 107. For example, the extracted table 102 may include two columns and the distinct key table 107 may include two columns. A key similarity score, a value similarity score, and a structure similarity score may be determined for a first column of the extracted table 102 and a first column of the distinct key table 107, the first column of the extracted table 102 and a second column of the distinct key table 107, the second column of the extracted table 102 and the first column of the distinct key table 107, and the second column of the extracted table 102 and the second column of the distinct key table 107.

The API specification module 104 may determine a column similarity score for each column in the extracted table 102 and each column of the distinct key table 107 based on the key similarity scores, the value similarity scores, and the structure similarity scores. In some embodiments, the column similarity score may be determined using Equation 1.

$$\frac{jl\sum S_i + jl\sum V_l + \sum K_j}{i*j*l} \quad \text{Equation 1}$$

In Equation 1, i is a value within a range of one and the total number of key terms, j is a value within a range of one and the total number of value terms, 1 is a value within a range of one and the total number of root parents, $S_i$ is the structure similarity score of the root parents for the ith column of the extracted table 102 and each column of the distinct key table 107, $V_i$ is the value similarity scores of the ith value term for each column of the extracted table 102 and each column of the distinct key table 107, and $K_i$ is the key similarity scores of the ith key term for each column of the extracted table and each column of the distinct key table 107. Values for the column similar sore may be within a range of zero to one in which a column similar score of zero may represent a low similarity and a column similar score of one may represent a high similarity. In some embodiments, values for the column similar score may be less than zero or greater than one.

In an example embodiment, the column similarity score for a column in the distinct key table 107 associated with key term "name" and for a column in the extracted table 102 associated with key term "field" may be the same or substantially similar and the two columns may be mapped to the same class of API parameters in the defined format. For example, if the content of the distinct key table 107 (e.g., "Name" with a value of "P2", "Default Value" with a value of "123" and "Required Field" with a value of "True") has a high similarity (e.g., 90%) to the content of the extracted table 102, then the content of the distinct key table 107 may be associated with corresponding parameters of the extracted table 102. The value of three might be computed if a key term match (e.g., plus one), a value term match (e.g., plus one), and a root parent match (e.g., plus one) are present.

The API specification module 104 may determine whether the column similarity score for each column of the extracted table 102 and each column of the distinct key table 107 are within a similarity range. If a column similarity score for a column of the extracted table 102 and a column of the distinct key table 107 are within the similarity range, the API specification module 104 may associate the column of the extracted table with the class of API parameter associated with the corresponding column of the distinct key table 107 in the defined format.

Additionally or alternatively, mapping the various columns of the extracted table 102 to the classes of API parameters in the defined format may be based on weighted scores of the key similarity score, the value similarity score, and/or the structure similarity score.

The API specification module 104 may be configured to output the API specification 112 in the defined format. The API specification 112 may include the key terms, the value terms, and the root parents of the API table 110 mapped to various classes of API parameters in the defined format.

Mapping API parameters in one or more formats to classes of API parameters in the defined format may reduce an amount of time needed to review various API specifications. Likewise, mapping API parameters to a machine readable defined format may simplify the process for finding different API parameters by allowing a machine to be able to read the API specification 108 in a single format.

FIGS. 2, 3, 5, and 6 illustrate flow diagrams of example methods. The methods may be performed by processing logic that may include hardware (circuitry, dedicated logic, etc.), software (such as is run on a general purpose computer system or a dedicated machine), or a combination of both. The processing logic may be included in the API specification module 104 of FIG. 1, or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

Figure 2:
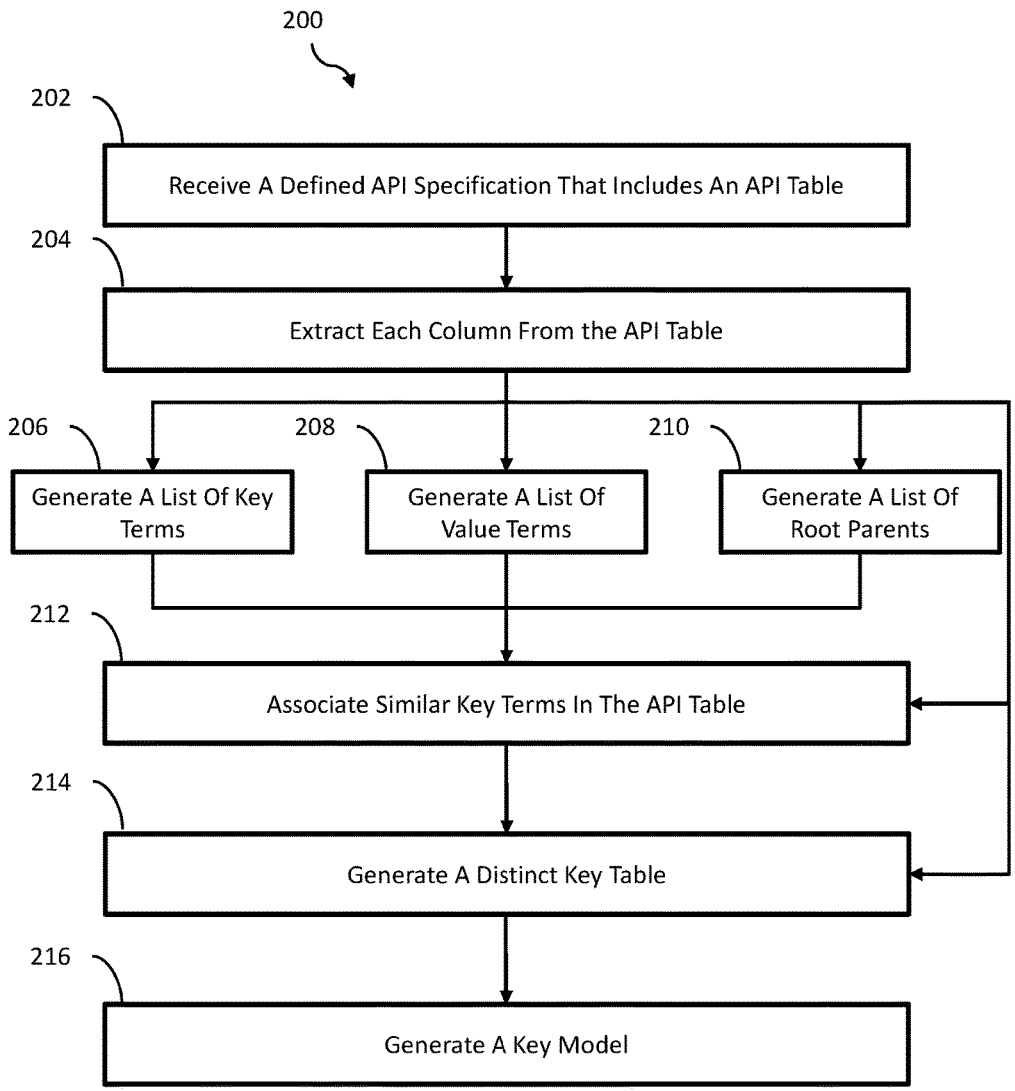
FIG. 2 illustrates a flow diagram of an example method related to generating a key model.

FIG. 2 illustrates a flow diagram of an example method 200 related to generating a key model, in accordance with at least one embodiment described herein. The method 200 may begin at block 202, where the processing logic may receive a defined API specification that includes an API table. For example, the processing logic may receive the defined API specification 108 that includes the API table 110 of FIG. 1. The defined API specification and/or the API table may include one or more API parameters in a first format.

At block 204, the processing logic may extract each column from the API table. Each column of the API table may include a key term, a value term, and/or a root parent associated with an API parameter in the first format.

At block 206, the processing logic may generate a list of key terms. For example, the list may include each associated key term for the API parameters in the API table. At block 208, the processing logic may generate a list of value terms. The list of value terms may include each associated value term for the API parameters in the API table. At block 210, the processing logic may generate a list of root parents. The list of root parents may include a file path for each key term and/or value term in the API table.

At block 212, the processing logic may associate similar key terms in the API table. For example, the key term "required" and the key term "needed" may be associated to indicate they are related or include similar functionality.

At block 214, the processing logic may generate a distinct key table. For example, the processing logic may generate the distinct key table 107 of FIG. 1. The distinct key table may include one or more key term, value term, and/or root parent in the API table. Additionally, each key term and the corresponding value term and root parent may be associated in the distinct key table. For example, a row of the distinct key table that is associated with a first key term may include all associated key terms in the first column, all corresponding value terms associated with the first key term in the second column, and all corresponding root parents associated with the first key term and the value terms associated with the first key term in the third column.

At block 216, the processing logic may generate a key model. For example, the processing logic may generate the key model 106 of FIG. 1. The key model may include one or more of the key terms, the value terms, the root parents, and/or the API parameters of the API table mapped to a class of API parameters in a defined format. The defined format may include any acceptable machine readable format for API parameters.

Figure 3:
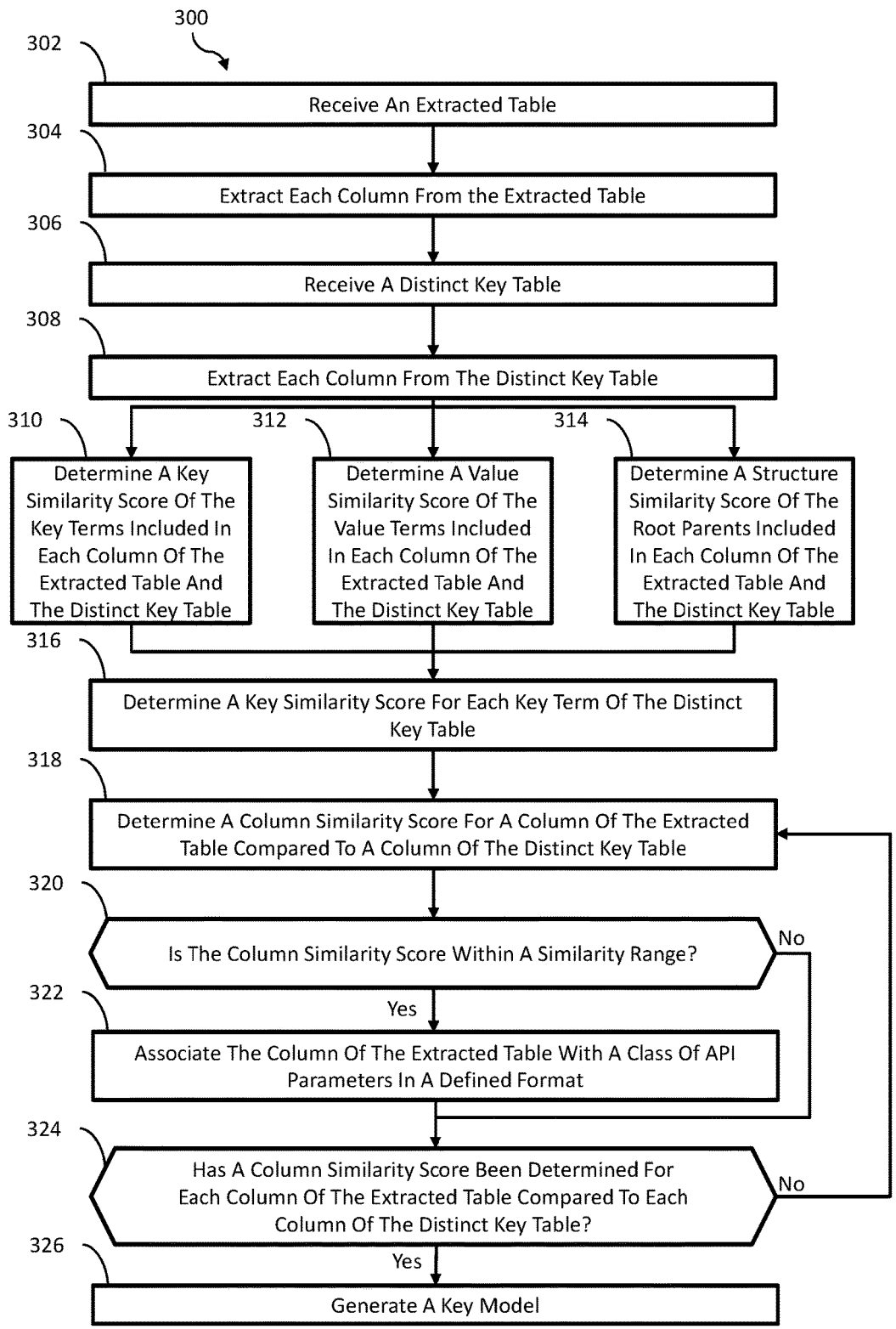
FIG. 3 illustrates a flow diagram of another example method related to generating a key model.

FIG. 3 illustrates a flow diagram of another example method 300 related to generating a key model, in accordance with at least one embodiment described herein. The method 300 may begin at block 302, where the processing logic may receive an extracted table. For example, the processing logic may receive the extracted table 102 of FIG. 1. Each column of the extracted table may include an API parameter in a first format. The extracted table may also include one or more key terms, value terms, and/or root parents associated with the API parameters in the first format.

At block 304, the processing logic may extract each column from the extracted table. For example, each key term and corresponding value term and/or root parent may be extracted from the extracted table.

At block 306, the processing logic may receive a distinct key table. For example, the processing logic may receive the distinct key table 107 of FIG. 1. The distinct key table is discussed in more detail above in relation to FIG. 2. At block 308, the processing logic may extract each column from the distinct key table. Each column of the distinct key table may include an API parameter in a defined format. Likewise, the distinct key table may include one or more key terms, value terms, and/or root parents associated with each API parameter in the distinct key table.

At block 310, the processing logic may determine a key similarity score of the key terms included in each column of the extracted table and the distinct key table. The key similarity scores may indicate whether key terms in the columns of the extracted table and the columns of the distinct key table are similar or not. For example, the key similarity scores may indicate that key terms such as "field," "property," and "parameter" are similar property key terms. Additionally, the processing logic may compare each column of the extracted table to each column of the distinct key table to ensure that a key similarity score is determined for all combinations of columns of the extracted table and the distinct key table.

At block 312, the processing logic may determine a value similarity score of the value terms included in each column of the extracted table and the distinct key table. The value similarity scores may indicate whether value terms in the columns of the extracted table and the columns of the distinct key table are similar or not. Additionally or alternatively, the value similarity scores may indicate whether value terms and corresponding key terms are the same or substantially similar.

At block 314, the processing logic may determine a structure similarity score of the root parents included in each column of the extracted table and the distinct key table. The structure similarity scores may indicate whether two or more key terms and/or value terms in the columns of the extracted table and the columns of the distinct key table include a similar file path. A similar file path may indicate that two different key terms and/or value terms may be associated with each other even if the corresponding key similarity scores and/or value similarity scores do not indicate such.

At block 316, the processing logic may determine a key similarity score for each key term of the distinct key table. The key similarity score for each key term of the distinct key table may be used to determine a similarity range. For example, if the distinct key table includes a column title with a key term of Default Value and another column tiles with a key term of Default Value of Parameter, a key similarity score of 0.33 may be determined since one of three keywords in the key terms are matched.

At block 318, the processing logic may determine a column similarity score for a column of the extracted table compared to a column of the distinct key table. For example, the column similarity score may be determined for a first column of the extracted table compared to a first column of the distinct key table. The column similarity score may be determined using Equation 1, which is discussed in more detail above. The column similarity score may be determined based on the key similarity scores, the value similarity scores, and structure similarity scores for the column of the extracted table and for the column of the distinct key table.

At block 320, the processing logic may determine whether the column similarity score is within a similarity range. The column similarity range may be within a value range that is greater than the key similarity score for each key term of the distinct key table minus a threshold value and less than the key similarity score for each key term of the distinct key table plus the threshold value. For example, the threshold value may be greater than 0.70. In some embodiments, the threshold value may be less than or equal to 0.70. A column similarity score that is greater than the threshold value may indicate a similar table (e.g., a parameter table).

If the column similarity score is within the similarity range, the processing logic, at block 322, may associate the column of the extracted table with a class of API parameters in a defined format. The class of API parameters may be associated with the key term in the corresponding column of the distinct key table. If the column similarity score is not within the similarity range, the processing logic, at block 324, may determine whether a column similarity score has been determined for each column of the extracted table compared to each column of the distinct key table.

If a column similarity score has not been determined for each column of the extracted table compared to each column of the distinct key table, the processing logic may repeat the process of blocks 318, 320, 322, and/or 324 until a column similarity score has been determined for each column of the extracted table compared to each column of the distinct key table. If a column similarity score has been determined for each column of the extracted table compared to each column of the distinct key table, the processing logic, at block 326, may generate a key model. For example, the processing logic may generate the key model 106 of FIG. 1. The key model may include each key term, value term, root parent, and/or API parameter of the extracted table as part of one or more classes of API parameters in the defined format.

Figure 4:
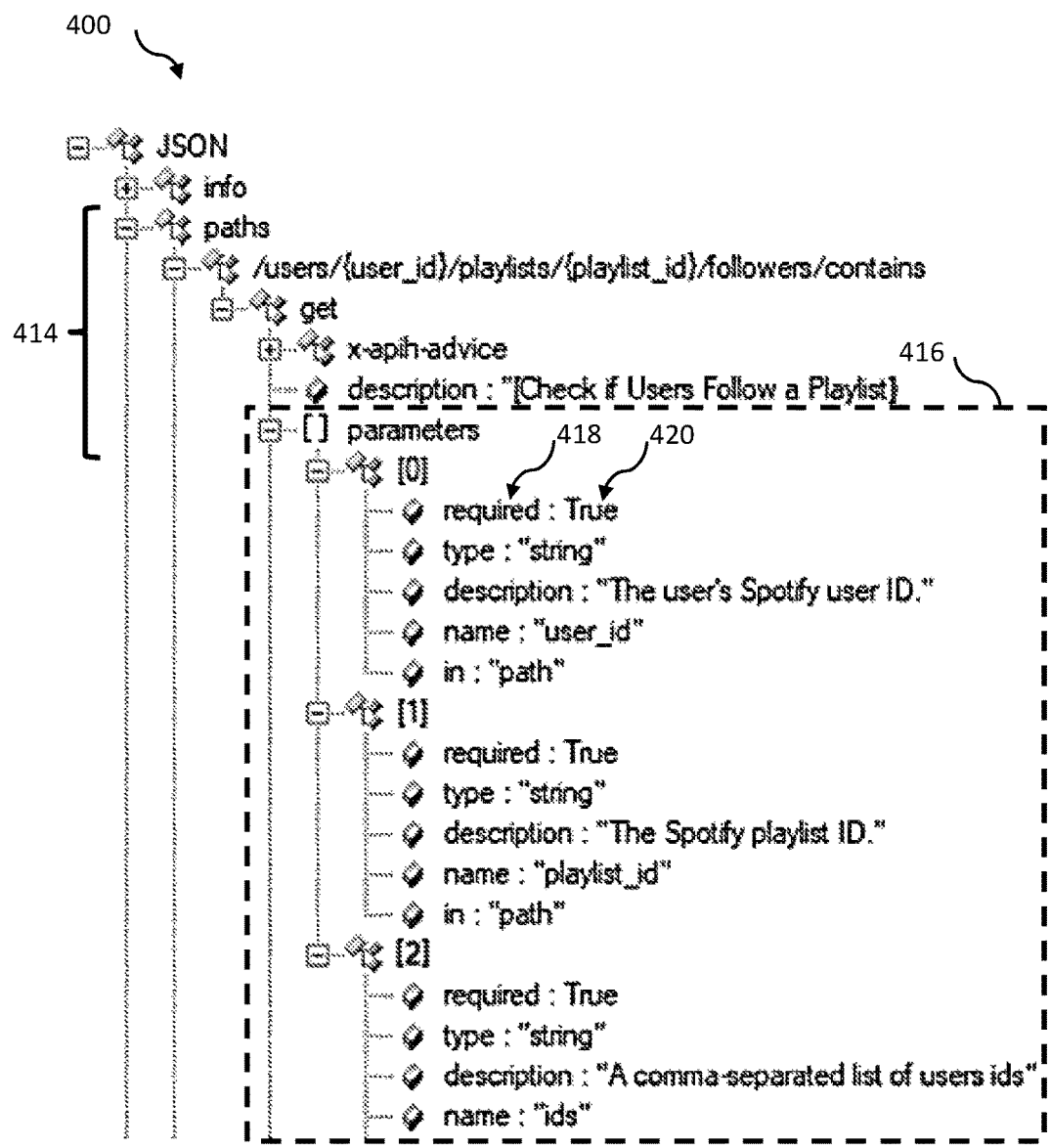
FIG. 4 illustrates a screen shot of example API documentation.

FIG. 4 illustrates a screen shot of example API documentation 400, in accordance with at least one embodiment described herein. The API documentation 400 may include an API table 416 and a file path 414 (herein 'root parent 414').

The API table 416 may include five columns that include key terms and value terms for an associated API parameter. In the example illustrated in FIG. 4, the five columns in [0] include keys terms of required, type, description, name, and in. In FIG. 4, the key term required is denoted as 418 to illustrate an example key term in the API table 416. Examples of key terms may include but are not limited to "default value ex.," "Value," "required?," "Example," "name," "examples," "field," "group," "location," "put," "post," "get," "uri," "delete," and "url." Likewise, the five columns in [0] include value terms of True, string, The user's Spotify user Id, user_id, and path. In FIG. 4, the value term True is denoted as 420 to illustrate an example value term in the API table 416. Additionally, the root parent 414 for the API table 416, the key terms, and the value terms may include paths→users→get→parameters.

Each column of the API table 416 may be extracted and each key term and value term may be collected. Additionally a frequency of each key term in the API table 416 may be determined. An example distinct key table may include:

[(u'description', 9490), (u'type', 4409), (u'parameter', 4021), (u'name', 1997), (u'value', 1861), (u'method', 1413), (u'required', 1212), (u'resource', 1201), (u'url', 684), (u'notes', 516), (u'default', 485), (u'endpoint', 455), (u'parameter name', 408), (u'api', 387), (u'http method', 343), (u'key', 308), (u'path', 282), (u'attribute', 266), (u'', 248), (u'example', 240), (u'field', 238), (u'required?', 237), (u'uri', 217), (u'default value ex.', 207), (u'function', 205), (u'auto-generated-0', 195), (u'location', 187), (u'verb', 177), (u'operation', 173), (u'required parameter', 173), (u'code', 161), (u'api method', 156), (u'action', 143), (u'parameters', 131), (u'options', 127), (u'arguments', 122), (u'param', 121), (u'http verb', 117), (u'default value', 116), (u'returns', 110), (u'method/url', 107), (u'http', 106), (u'data type', 99), (u'result', 99), (u'get', 97), (u'property', 93), (u'use', 93), (u'methods', 84), (u'presence', 83), (u'call type', 83), (u'sdk method', 83), (u'request/params', 82), (u'optional', 80), (u'response', 79), (u'status', 78), (u'field name', 77), (u'functionality', 76), (u'cached', 76), (u'auth', 76), (u'link', 74), (u'uri schema', 73), (u'reason', 70), (u'usage', 69), (u'authentication', 68), (u'request', 66), (u'overview', 64), (u'required/optional', 63), (u'required parameters', 61), (u'documentation', 61), (u'how to use', 58), (u'model', 57), (u'string', 56), (u'authorization', 55), (u'request body (xml)', 50), (u'validation', 47), (u'value to be specified', 46)]

Figure 5:
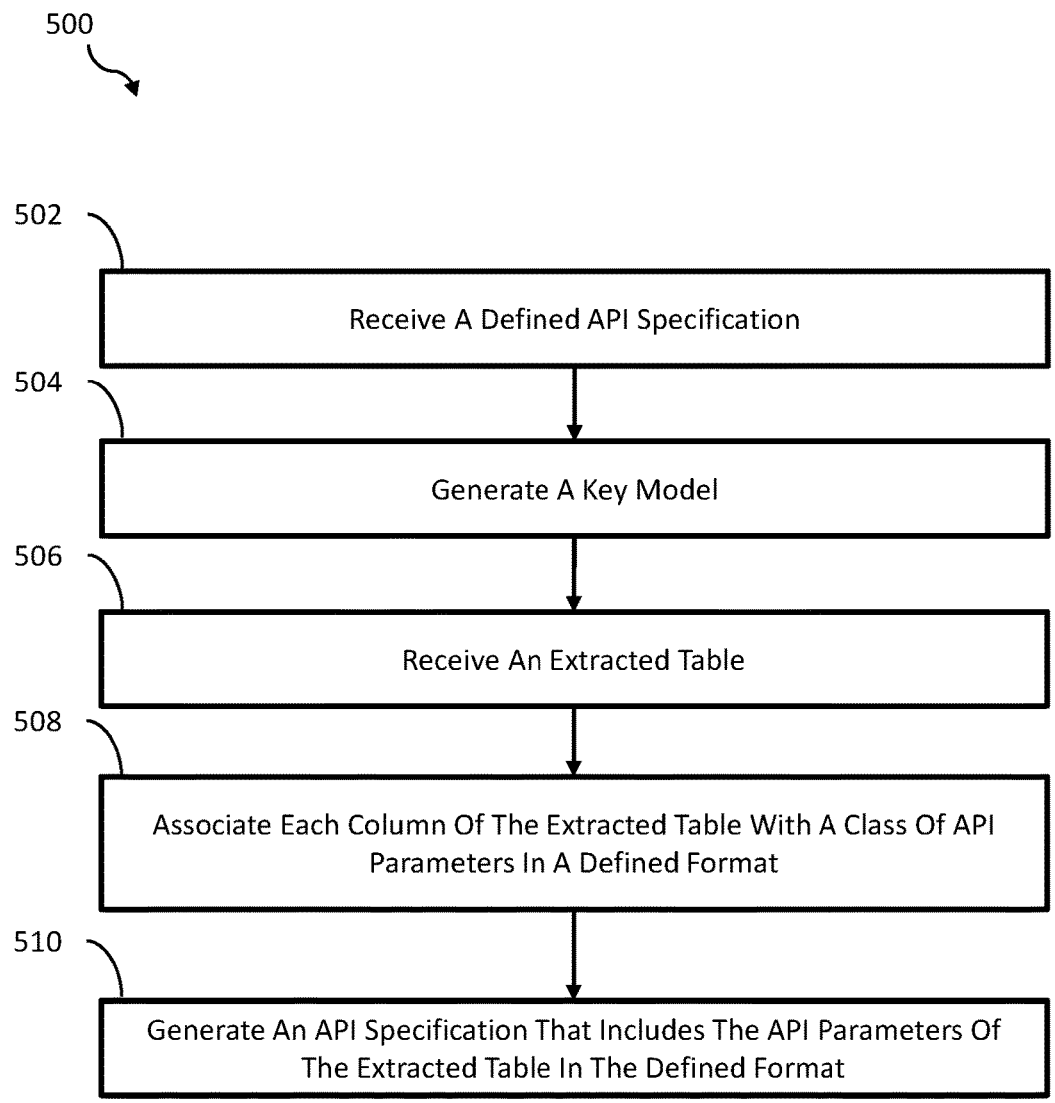
FIG. 5 illustrates a flow diagram of an example method related to generating an API specification in a defined format.

FIG. 5 illustrates a flow diagram of an example method 500 related to generating an API specification in a defined format, in accordance with at least one embodiment described herein. The method 500 may begin at block 502, where the processing logic may receive a defined API specification. The defined API specification may include an API table. For example, the processing logic may receive the defined API specification 108 that includes the API table 110 of FIG. 1. The defined API specification and/or the API table may include one or more API parameters in a first format. Likewise, each column of the API table may be associated with an API parameter.

At block 504, the processing logic may generate a key model. For example, the processing logic may generate the key model 106 of FIG. 1. The key model may include one or more of the key terms, the value terms, the root parents, and/or the API parameters of the API table and/or the defined API specification mapped to a class of API parameters in a defined format. The defined format may include any acceptable machine readable format for API parameters. Additionally, the key model may include one or more API parameters of the API table mapped to a corresponding class of API parameters in the defined format.

At block 506, the processing logic may receive an extracted table. For example, the processing logic may receive the extracted table 102 of FIG. 1. Each column of the extracted table may include an API parameter in the first format. The extracted table may also include key terms, value terms, and/or root parents associated with the API parameters in the first format. Each column of the extracted table may be associated with an API parameter in the first format. Additionally, each column of the extracted may be associated with a target API table (e.g., API parameters) in the first format.

At block 508, the processing logic may associate each column of the extracted table with a class of API parameters in the defined format. Each column of the extracted table may be associated with a class of API parameters based on the key model. Additionally, the processing logic may associate each column of the extracted table with the target API table (e.g., API parameters) in the defined format. At block 510, the processing logic may generate an API specification that includes the API parameters of the extracted table in the defined format.

Figure 6:
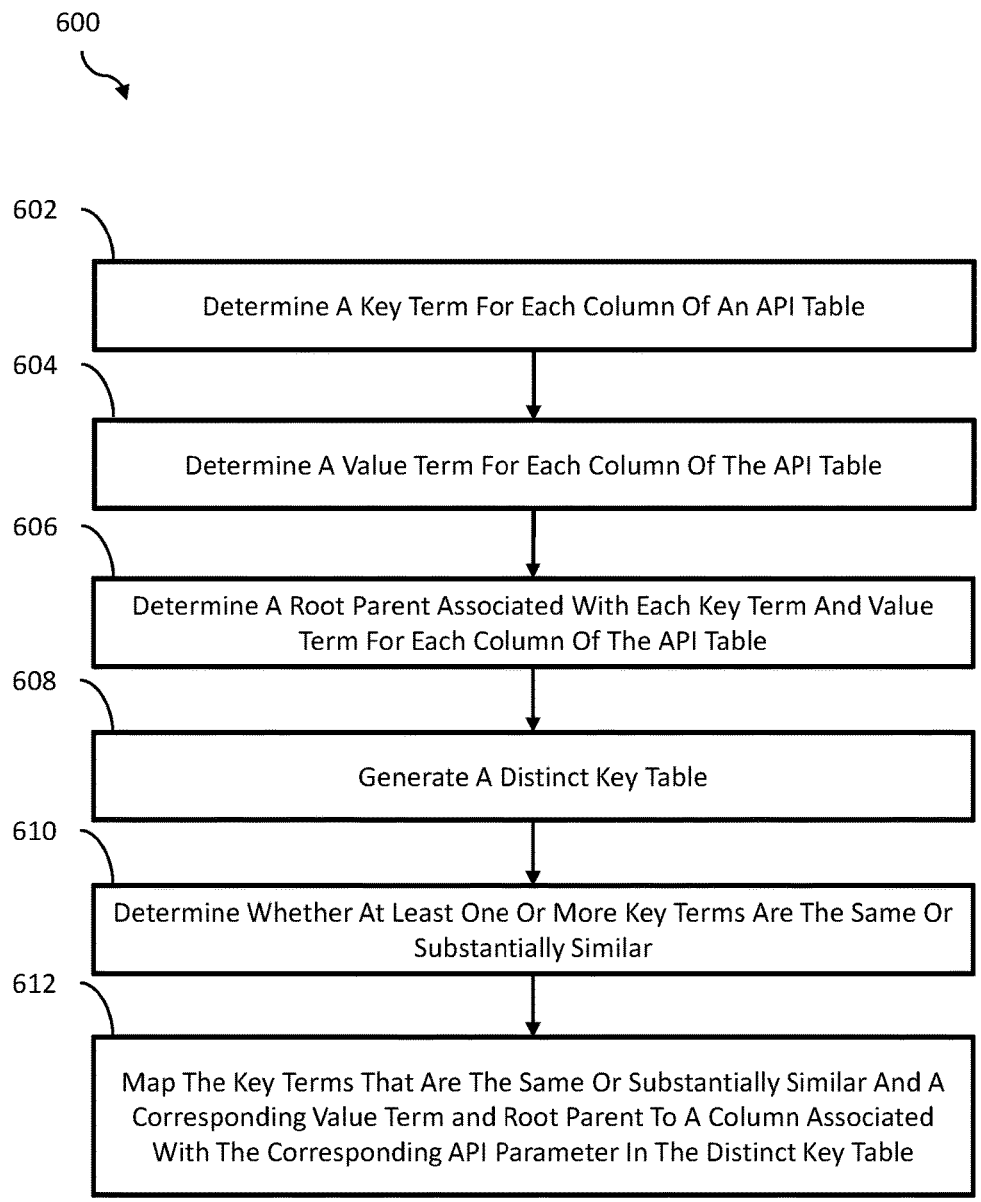
FIG. 6 illustrates a flow diagram of an example method related to associating key terms of an extracted table to key terms of an API table.

FIG. 6 illustrates a flow diagram of an example method 600 related to associating key terms of an extracted table to key terms of an API table, in accordance with at least one embodiment described herein. The method 600 may begin at block 602, where the processing logic may determine a key term for each column of the API table. Each key term may define an API parameter. At block 604, the processing logic may determine a value term for each column of the API table. Each value term may be associated with a corresponding key term for an API parameter. At block 606, the processing logic may determine a root parent associated with each key term and value term for each column of the API table.

At block 608, the processing logic may generate a distinct key table. For example, the processing logic may generate the distinct key table 107 of FIG. 1. The distinct key table may include one or more of the key terms, value terms, and/or root parents in the API table. Additionally, a key term and a corresponding value term and root parent may be associated in the distinct key table. A first column of the distinct key table may include a key term of the API table located in a different row. A second column of the distinct key table may include a value term in the same row as a corresponding key term. Likewise, a third column of the distinct key table may include a root parent in the same row as the corresponding key term and value term.

At block 610, the processing logic may determine whether at least one or more key terms are the same or substantially similar. If one or more key terms are the same or substantially similar, the processing logic, at block 612, may map the key terms that are the same or substantially similar and a corresponding value term and root parent to a column associated with the corresponding API parameter in the distinct key table. Additionally, a key model may be generated based on the distinct key table.

Figure 7:
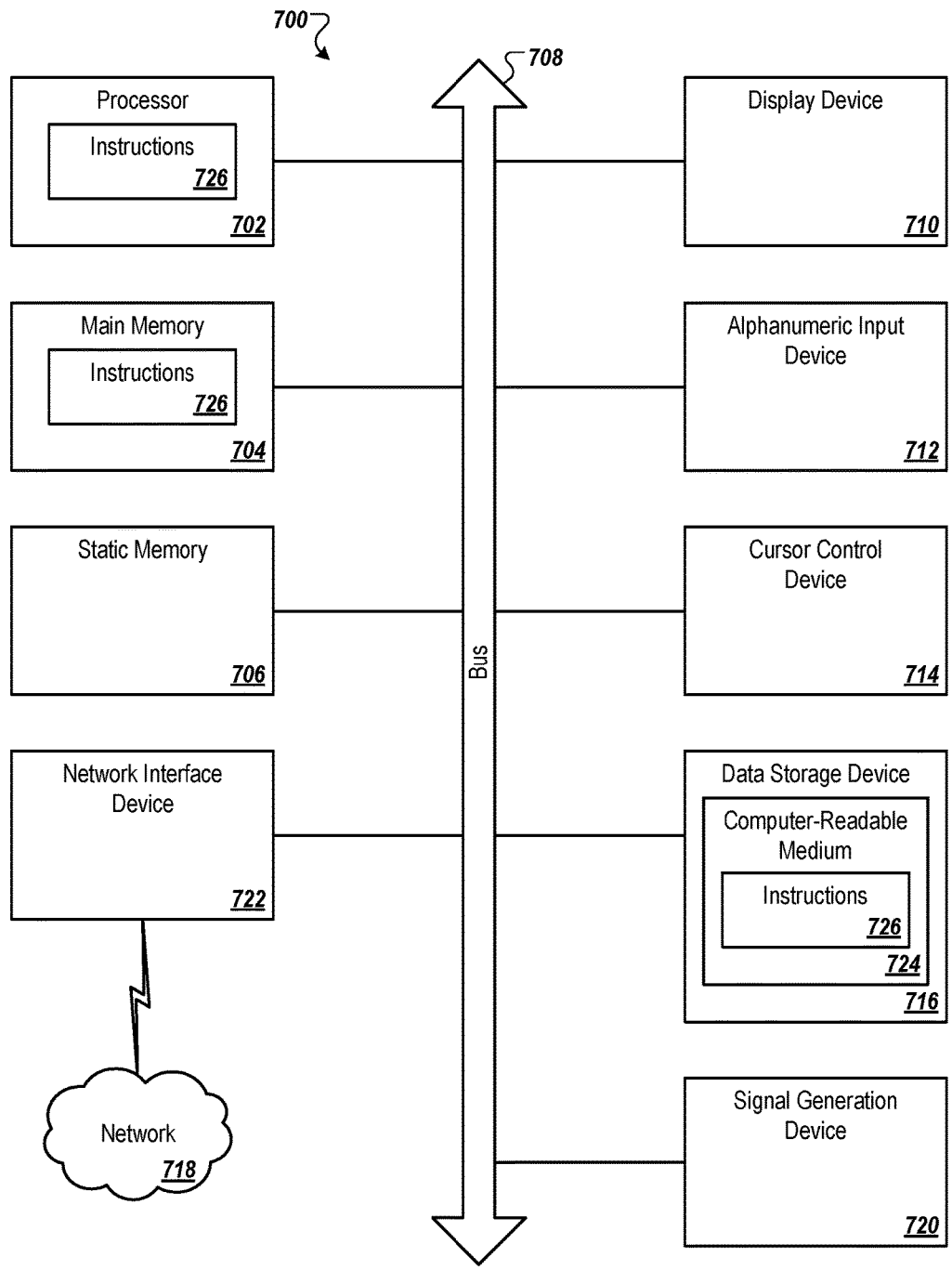
FIG. 7 illustrates a diagrammatic representation of a machine in the example form of a computing device within which a set of instructions, for causing the machine to perform any one or more of the methods discussed herein, may be executed, all arranged in accordance with at least one embodiment described herein.

FIG. 7 illustrates a diagrammatic representation of a machine in the example form of a computing device 700 within which a set of instructions, for causing the machine to perform any one or more of the methods discussed herein, may be executed. The computing device 700 may include a mobile phone, a smart phone, a netbook computer, a rack-mount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in a client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 700 includes a processing device (e.g., a processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)) and a data storage device 716, which communicate with each other via a bus 708.

Processing device 702 represents one or more general-purpose processing devices such as a microprocessor, central processing unit, or the like. More particularly, the processing device 702 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also include one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps discussed herein.

The computing device 700 may further include a network interface device 722, which may communicate with a network 718. The computing device 700 also may include a display device 710 (e.g., a liquid crystal display (LCD) or a cathode ray tube (CRT)), an alphanumeric input device 712 (e.g., a keyboard), a cursor control device 714 (e.g., a mouse) and a signal generation device 720 (e.g., a speaker). In one implementation, the display device 710, the alphanumeric input device 712, and the cursor control device 714 may be combined into a single component or device (e.g., an LCD touch screen).

The data storage device 716 may include a computer-readable storage medium 724 on which is stored one or more sets of instructions 726 (e.g., the API specification module 104) embodying any one or more of the methods or functions described herein. The instructions 726 may also reside, completely or at least partially, within the main memory 704 and/or within the processing device 702 during execution thereof by the computing device 700, the main memory 704 and the processing device 702 also constituting computer-readable media. The instructions may further be transmitted or received over the network 718 via the network interface device 722.

While the computer-readable storage medium 724 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media, and magnetic media.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A system, comprising:
   a communication interface; and
   a processor operatively coupled to the communication interface, the processor being configured to perform operations comprising:
   receive, via the communication interface, a defined application programming interface (API) specification, the defined API specification includes an API table in a first format and each column of the API table is associated with an API parameter;
   generate a key model based on the defined API specification, the key model includes one or more API parameters of the API table mapped to a corresponding class of API parameters in a defined format;
   receive, via the communication interface, an extracted table, each column of the extracted table is associated with an API parameter in the first format;
   associate each column of the extracted table with a class of API parameters in the defined format based on the key model; and
   generate an API specification that includes the API parameters of the extracted table in the defined format.

2. The system of claim 1, wherein the operation generate a key model based on the defined API specification comprises:
   determine a key term for each column of the API table, wherein each key term defines an API parameter;
   determine a value term for each column of the API table;
   determine a root parent associated with each key term and value term for each column of the API table;
   generate a distinct key table, wherein a first column of the distinct key table includes a key term of the API table located in a different row, a second column includes a value term in the same row as a corresponding key term, and a third column includes a root parent in the same row as the corresponding key term and value term;
   determine whether at least one or more key terms are the same or substantially similar; and
     in response to determining one or more key terms are the same or substantially similar, map the key terms that are the same or substantially similar and a corresponding value term and root parent to a column associated with the corresponding API parameter in the distinct key table, wherein the key model is generated based on the distinct key table.

3. The system of claim 2, wherein each root parent includes a structure of a file path to access each key term and value term.

4. The system of claim 2, the processor further configured to:
   determine a key similarity score of the key term included in each column of the extracted table and each column of the distinct key table;
   determine a value similarity score of the value term included in each column of the extracted table and each column of the distinct key table; and
   determine a structure similarity score of the root parent included in each column of the extracted table and each column of the distinct key table.

5. The system of claim 4, wherein the operation associate each column of the extracted table with a class of API parameters in the defined format based on the key model comprises determine a column similarity score for each column of the extracted table and each column of the distinct key table according to $$\frac{jl \sum S_i + j \sum V_l + \sum K_j}{i * j * l}$$

where i is a value within a range of one and a total number of key terms, j is a value within a range of one and a total number of value terms, l is a value within a range of one and a total number of root parents, $S_i$ is the structure similarity score of the root parents for an ith column of the extracted table and each column of the distinct key table, $V_i$ is the value similarity scores of an ith value term for each column of the extracted table and each column of the distinct key table, and $K_i$ is the key similarity scores of an ith key term for each column of the extracted table and each column of the distinct key table.

6. The system of claim 5, wherein the operation associate each column of the extracted table with a class of API parameters in the defined format based on the key model further comprises:
   determine whether the column similarity score for each column of the extracted table and each column of the distinct key table is within a similarity range; and
   in response to determining that the column similarity score for a column of the extracted table and a column of the distinct key table is within the similarity range, associate the column of the extracted table to a corresponding class of API parameters in the defined format.

7. The system of claim 1, wherein the extracted table includes at least one of one or more key terms, one or more value terms, and one or more root parents associated with API parameters included in the extracted table in the first format.

8. A method, comprising:
   receiving, via a communication interface, a defined application programming interface (API) specification, the defined API specification includes an API table in a first format and each column of the API table is associated with an API parameter;
   generating a key model based on the defined API specification, wherein the key model includes one or more API parameters of the API table mapped to a corresponding class of API parameters in a defined format;
   receiving, via the communication interface, an extracted table, each column of the extracted table is associated with an API parameter in the first format;
   associating each column of the extracted table with a class of API parameters in the defined format based on the key model; and
   generating an API specification that includes the API parameters of the extracted table in the defined format.

9. The method of claim 8, wherein generating a key model based on the defined API specification comprises:
   determining a key term for each column of the API table, wherein each key term defines an API parameter;
   determining a value term for each column of the API table;
   determining a root parent associated with each key term and value term for each column of the API table;
   generating a distinct key table, wherein a first column of the distinct key table includes a key term of the API table located in a different row, a second column includes a value term in the same row as a corresponding key term, and a third column includes a root parent in the same row as the corresponding key term and value term;
   determining whether at least one or more key terms are the same or substantially similar; and
      in response to determining one or more key terms are the same or substantially similar, mapping the key terms that are the same or substantially similar and a corresponding value term and root parent to a column associated with the corresponding API parameter in the distinct key table, wherein the key model is generated based on the distinct key table.

10. The method of claim 9, the method further comprises:
    determining a key similarity score of the key term included in each column of the extracted table and each column of the distinct key table;
    determining a value similarity score of the value term included in each column of the extracted table and each column of the distinct key table; and
    determining a structure similarity score of the root parent included in each column of the extracted table and each column of the distinct key table.

11. The method of claim 10, wherein associating each column of the extracted table with a class of API parameters in the defined format based on the key model comprises determining a column similarity score for each column of the extracted table and each column of the distinct key table according to $$\frac{jl \sum S_i + j \sum V_l + \sum K_j}{i * j * l}$$

where i is a value within a range of one and a total number of key terms, j is a value within a range of one and a total number of value terms, l is a value within a range of one and a total number of root parents, $S_i$ is the structure similarity score of the root parents for an ith column of the extracted table and each column of the distinct key table, $V_i$ is the value similarity scores of an ith value term for each column of the extracted table and each column of the distinct key table, and $K_i$ is the key similarity scores of an ith key term for each column of the extracted table and each column of the distinct key table.

17

12. The method of claim 11, wherein associating each column of the extracted table with a class of API parameters in the defined format based on the key model further comprises:
  determining whether the column similarity score for each column of the extracted table and each column of the distinct key table is within a similarity range; and
  in response to determining that the column similarity score for a column of the extracted table and a column of the distinct key table is within the similarity range, associating the column of the extracted table to a corresponding class of API parameters in the defined format.

13. The method of claim 8, wherein the extracted table includes at least one of one or more key terms, one or more value terms, and one or more root parents associated with API parameters included in the extracted table in the first format.

14. A non-transitory computer-readable medium having encoded therein, programming code executable by a processor to perform operations comprising:
  receiving, via a communication interface, a defined application programming interface (API) specification, the defined API specification includes an API table in a first format and each column of the API table is associated with an API parameter;
  generating a key model based on the defined API specification, the key model includes one or more API parameters of the API table mapped to a corresponding class of API parameters in a defined format;
  receiving, via the communication interface, an extracted table, each column of the extracted table is associated with an API parameter in the first format;
  associating each column of the extracted table with a class of API parameters in the defined format based on the key model; and
  generating an API specification that includes the API parameters of the extracted table in the defined format.

15. The non-transitory computer-readable medium of claim 14, the generating a key model based on the defined API specification comprises:
  determining a key term for each column of the API table, wherein each key term defines an API parameter;
  determining a value term for each column of the API table;
  determining a root parent associated with each key term and value term for each column of the API table;
  generating a distinct key table, wherein a first column of the distinct key table includes a key term of the API table located in a different row, a second column includes a value term in the same row as a corresponding key term, and a third column includes a root parent in the same row as the corresponding key term and value term;
  determining whether at least one or more key terms are the same or substantially similar; and
  in response to determining one or more key terms are the same or substantially similar, mapping the key terms that are the same or substantially similar and a corresponding value term and root parent to a column associated with the corresponding API parameter in the distinct key table, wherein the key model is generated based on the distinct key table.

16. The non-transitory computer-readable medium of claim 15, wherein each root parent includes a structure of a file path to access each key term and value term.

17. The non-transitory computer-readable medium of claim 15, the operations further comprising:
  determining a key similarity score of the key term included in each column of the extracted table and each column of the distinct key table;
  determining a value similarity score of the value term included in each column of the extracted table and each column of the distinct key table; and
  determining a structure similarity score of the root parent included in each column of the extracted table and each column of the distinct key table.

18. The non-transitory computer-readable medium of claim 17, wherein the operation associating each column of the extracted table with a class of API parameters in the defined format based on the key model comprises determining a column similarity score for each column of the extracted table and each column of the distinct key table according to $$\frac{jl\sum S_i + j\sum V_l + \sum K_j}{i * j * l}$$

where i is a value within a range of one and a total number of key terms, j is a value within a range of one and a total number of value terms, l is a value within a range of one and a total number of root parents, $S_i$ is the structure similarity score of the root parents for an ith column of the extracted table and each column of the distinct key table, $V_i$ is the value similarity scores of an ith value term for each column of the extracted table and each column of the distinct key table, and $K_i$ is the key similarity scores of an ith key term for each column of the extracted table and each column of the distinct key table.

19. The non-transitory computer-readable medium of claim 18, wherein the operation associating each column of the extracted table with a class of API parameters in the defined format based on the key model further comprises:
  determining whether the column similarity score for each column of the extracted table and each column of the distinct key table is within a similarity range; and
  in response to determining that the column similarity score for a column of the extracted table and a column of the distinct key table is within the similarity range, associating the column of the extracted table to a corresponding class of API parameters in the defined format.

20. The non-transitory computer-readable medium of claim 14, wherein the extracted table includes at least one of one or more key terms, one or more value terms, and one or more root parents associated with API parameters included in the extracted table in the first format.

* * * * *